No. 617,618.  
B. H. THWAITE.  
APPARATUS FOR SEPARATING DUST FROM BLAST FURNACE GASES.  
(Application filed Apr. 4, 1898.)  
(No Model.)  
Patented Jan. 10, 1899.
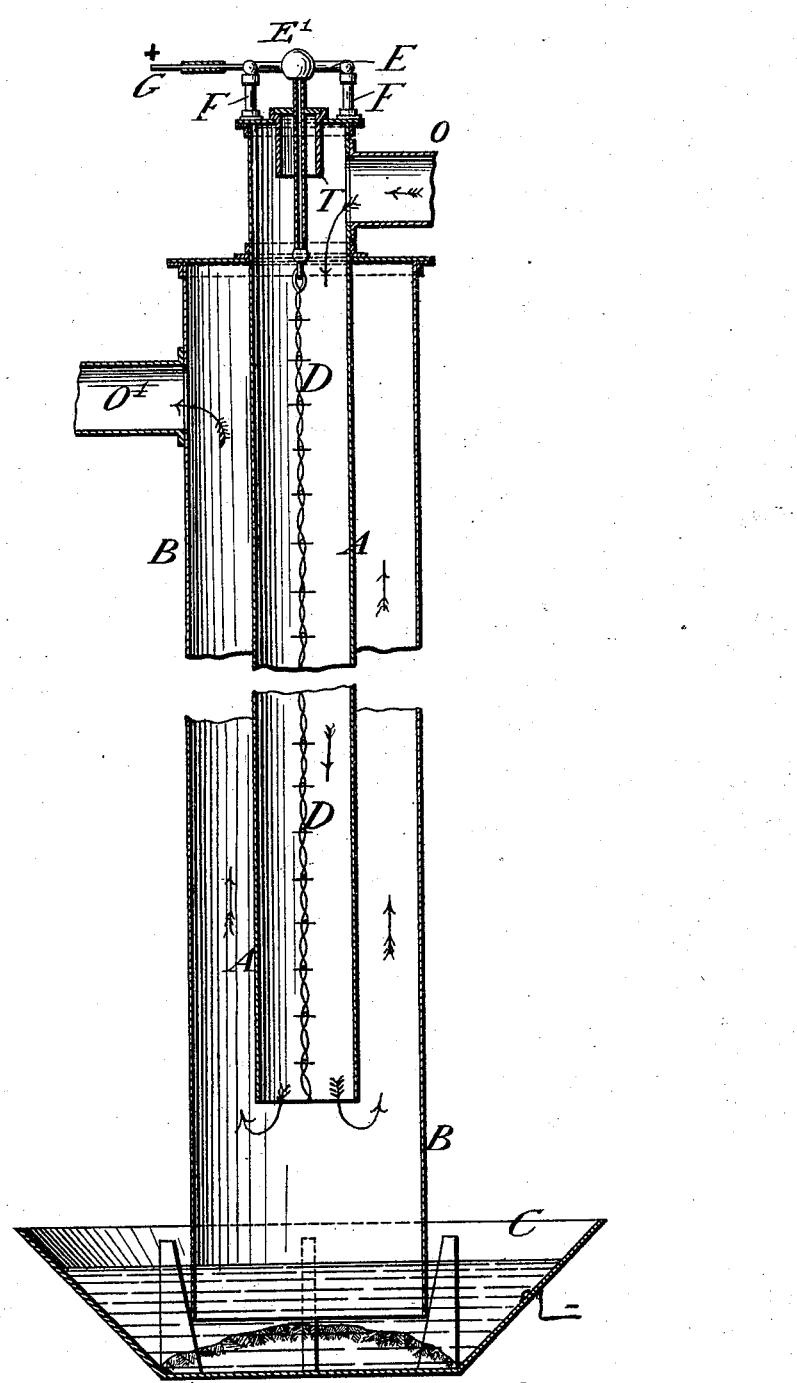

UNITED STATES PATENT OFFICE.

BENJAMIN HOWARTH THWAITE, OF LONDON, ENGLAND, ASSIGNOR OF ONE-HALF TO FRANK LACROIX GARDNER, OF SAME PLACE.

APPARATUS FOR SEPARATING DUST FROM BLAST-FURNACE GASES.

SPECIFICATION forming part of Letters Patent No. 617,618, dated January 10, 1899.

Application filed April 4, 1898. Serial No. 676,381. (No model.)

*To all whom it may concern:*

Be it known that I, BENJAMIN HOWARTH THWAITE, civil engineer, a citizen of England, residing at No. 29 Great George street, Westminster, London, England, have invented certain new and useful Improvements in Apparatus for Separating Dust from Blast-Furnace Gases, of which the following is a specification.

This invention relates to means of separating dust from blast-furnace gases as they descend the "downcomer" or pipe by which they are led from the top of the furnace, as I shall describe, referring to the accompanying drawing, which is a vertical section of the downcomer of a blast-furnace provided with dust-separating apparatus according to my invention.

A is the downcomer, having its lower part inclosed in an outer casing B, which dips into water in a vessel C.

In the downcomer A, I suspend a barbed or twisted wire D, or it might be a rod or chain having numerous projecting points, or in the case of a large downcomer I may suspend several such wires, rods, or chains. The vessel C is made with sloping sides to facilitate the raking of deposit out of it. It is kept supplied with sufficient water to maintain a liquid seal, preventing entrance of air.

The wire, rod, or chain D, or each of these when several are used, is attached to a cross-head E, which is supported on columns F, of insulating material, and is connected by a conductor G to one terminal of a source of electricity such as can furnish currents of very high tension, as may be obtained from an electrical machine or from a dynamo and high-tension transformer.

The upper part of the wire, rod, or chain is inclosed within a tube T, of non-conducting material.

As the electricity is discharged from the barbs or points the particles suspended in the descending gases become separated from the gases and are deposited in the vessels C, while the more or less purified gases ascend the annular space between the downcomer A and the casing B to an outlet O, whence they are conducted to any place where they are to be utilized as fuel for a gas-engine or for other purposes.

I have shown in the drawing only one conductor G, which leads from the positive pole of the generator to the cross-head E. A return-wire or second conductor leading back to the negative pole is unnecessary, since the very high tension of the currents employed causes the latter to dissipate rapidly from the points of the wire D and pass into the atmosphere in the downcomer A.

The upper part of the suspended conductor D is attached to a ball or other rounded body E', mounted on the cross-head E, in order to prevent loss of electricity due to leakage into the surrounding air from sharp angles or corners, which is a characteristic of all high-tension currents.

The course of the gases which enter from the passage O at or near the top of the downcomer A is shown by arrows. After flowing through the latter they pass into the annular space between the downcomer A and the outer casing B, and near the top of the latter they find egress through a passage O'.

Having thus described the nature of this invention and the best means I know of carrying the same into practical effect, I claim—

1. In an apparatus for separating dust from blast-furnace gases, the combination with a downcomer having a surrounding casing with an annular intervening space for the gases and fumes, of a vessel containing fluid in which the lower end of the surrounding casing is submerged, a conductor of electricity suspended centrally in the downcomer and provided with projecting points, and a generator of high-tension currents of electricity, the lower end of the downcomer lying above the level of the fluid in said vessel, substantially as described.

2. In an apparatus for separating dust from blast-furnace gases, the combination with a downcomer and with a concentric surrounding casing, of a vessel having sloping sides and containing fluid in which the lower end of the said casing is submerged, a conductor of electricity suspended centrally in the downcomer and provided with numerous projecting points, and a generator of high-tension currents of electricity, the lower end of the downcomer lying above the fluid in said vessel to permit the gases and fumes to pass into the annular space between said downcomer and the surrounding casing, substantially as described.

In testimony whereof I have hereunto set my hand in presence of two subscribing witnesses.

BENJAMIN HOWARTH THWAITE.

Witnesses:
OLIVER IMRAY,
JNO. P. M. MILLARD.